United States Patent
Green

(10) Patent No.: US 9,159,325 B2
(45) Date of Patent: Oct. 13, 2015

(54) PITCH SHIFTING FREQUENCIES

(75) Inventor: Peter Green, Kirkland, WA (US)

(73) Assignee: ADOBE SYSTEMS INCORPORATED, San Jose, CA (US)

(*) Notice: Subject to any disclaimer, the term of this patent is extended or adjusted under 35 U.S.C. 154(b) by 1526 days.

(21) Appl. No.: 11/967,790

(22) Filed: Dec. 31, 2007

(65) Prior Publication Data

US 2015/0206540 A1  Jul. 23, 2015

(51) Int. Cl.
| | |
|---|---|
| G06F 3/048 | (2013.01) |
| G10L 19/00 | (2013.01) |
| G06F 17/30 | (2006.01) |
| G06F 3/0484 | (2013.01) |
| G10H 1/00 | (2006.01) |

(52) U.S. Cl.
CPC ............. G10L 19/00 (2013.01); *G06F 3/04847* (2013.01); *G06F 17/30716* (2013.01); *G10H 1/0008* (2013.01)

(58) Field of Classification Search
CPC .......................... G10L 19/00; G06F 17/30716
USPC ........................... 715/716, 727, 771, 773, 726
See application file for complete search history.

(56) References Cited

U.S. PATENT DOCUMENTS

| | | | | |
|---|---|---|---|---|
| 4,646,609 A | * | 3/1987 | Teruo et al. | 84/615 |
| 4,665,790 A | * | 5/1987 | Rothschild | 84/454 |
| 4,696,216 A | * | 9/1987 | Asahi et al. | 84/609 |
| 4,771,671 A | * | 9/1988 | Hoff, Jr. | 84/645 |
| 4,783,805 A | * | 11/1988 | Nishio et al. | 704/207 |
| 4,827,516 A | * | 5/1989 | Tsukahara et al. | 704/224 |
| 4,860,624 A | * | 8/1989 | Dinnan et al. | 84/613 |
| 4,939,782 A | * | 7/1990 | Gambacurta et al. | 381/103 |
| 5,038,658 A | * | 8/1991 | Tsuruta et al. | 84/461 |

(Continued)

FOREIGN PATENT DOCUMENTS

| | | | | |
|---|---|---|---|---|
| DE | 196 21 518 A1 | * | 5/1996 | G09B 15/00 |
| GB | 2422755 A | * | 8/2006 | G10H 1/36 |

(Continued)

OTHER PUBLICATIONS

Microsoft® Windows® 2000/Windows XP Adobe Audition version 1.5, Mar. 4, 2004, Adobe Systems Incorporated, http://web.archive.org/web/20040426000056/www.adobe.com/products/audition/pdfs/audition~nfhs.p.*

(Continued)

*Primary Examiner* — Boris Pesin
*Assistant Examiner* — John Heffington
(74) *Attorney, Agent, or Firm* — Shook, Hardy & Bacon, L.L.P.

(57) ABSTRACT

System and methods for audio editing are provided. In one implementation, a computer-implemented method is provided. The computer-implemented method includes presenting a visual representation of digital audio data as a frequency spectrum including a first visual region corresponding to a first time period and a first frequency range in the digital audio data. A first user input identifies a second visual region within the first visual region and corresponding to a second time period and a second frequency range. A second user input specifies one or more frequency modifications to the second visual region. The second time period and the second frequency range corresponding to the second visual region are modified creating a modified second visual region. The modified second visual region is mixed into the first visual region creating edited digital audio data.

20 Claims, 10 Drawing Sheets

(56) References Cited

U.S. PATENT DOCUMENTS

| | | | | |
|---|---|---|---|---|
| 5,048,390 | A * | 9/1991 | Adachi et al. | 84/464 R |
| 5,151,998 | A | 9/1992 | Capps | |
| 5,159,140 | A * | 10/1992 | Kimpara et al. | 84/600 |
| 5,179,241 | A * | 1/1993 | Okuda et al. | 84/613 |
| 5,204,969 | A | 4/1993 | Capps et al. | |
| 5,214,993 | A * | 6/1993 | Konishi | 84/637 |
| 5,221,802 | A * | 6/1993 | Konishi et al. | 84/637 |
| 5,271,404 | A * | 12/1993 | Corl et al. | 600/454 |
| 5,287,789 | A * | 2/1994 | Zimmerman | 84/477 R |
| 5,310,962 | A * | 5/1994 | Kimpara et al. | 84/600 |
| 5,331,111 | A * | 7/1994 | O'Connell | 84/602 |
| 5,339,392 | A * | 8/1994 | Risberg et al. | 715/762 |
| 5,375,501 | A * | 12/1994 | Okuda | 84/611 |
| 5,437,050 | A * | 7/1995 | Lamb et al. | 725/22 |
| 5,442,129 | A * | 8/1995 | Mohrlok et al. | 84/637 |
| 5,447,438 | A * | 9/1995 | Watanabe et al. | 434/307 A |
| 5,473,727 | A * | 12/1995 | Nishiguchi et al. | 704/222 |
| 5,477,003 | A * | 12/1995 | Muraki et al. | 434/307 A |
| 5,563,358 | A * | 10/1996 | Zimmerman | 84/477 R |
| 5,563,866 | A * | 10/1996 | Taguchi et al. | 369/83 |
| 5,626,629 | A * | 5/1997 | Faltys et al. | 607/57 |
| 5,763,800 | A * | 6/1998 | Rossum et al. | 84/603 |
| 5,862,232 | A * | 1/1999 | Shinbara et al. | 381/61 |
| 5,973,252 | A * | 10/1999 | Hildebrand | 84/603 |
| 6,064,400 | A * | 5/2000 | Wrey | 345/440 |
| 6,166,313 | A * | 12/2000 | Miyamoto | 84/477 R |
| 6,281,650 | B1 * | 8/2001 | Yutkowitz | 318/561 |
| 6,289,247 | B1 * | 9/2001 | Faltys et al. | 607/57 |
| 6,331,864 | B1 * | 12/2001 | Coco et al. | 715/763 |
| 6,392,135 | B1 * | 5/2002 | Kitayama | 84/622 |
| 6,417,437 | B2 * | 7/2002 | Aoki | 84/611 |
| 6,472,591 | B2 * | 10/2002 | Aoki et al. | 84/611 |
| 6,525,717 | B1 * | 2/2003 | Tang | 345/177 |
| 6,610,917 | B2 * | 8/2003 | Ludwig | 84/726 |
| 6,740,802 | B1 * | 5/2004 | Browne, Jr. | 84/609 |
| 6,782,365 | B1 * | 8/2004 | Case | 704/278 |
| 6,791,021 | B2 * | 9/2004 | Aoki | 84/613 |
| 6,951,977 | B1 * | 10/2005 | Streitenberger et al. | 84/626 |
| 6,992,245 | B2 * | 1/2006 | Kenmochi et al. | 84/622 |
| 6,993,480 | B1 * | 1/2006 | Klayman | 704/226 |
| 7,174,510 | B2 * | 2/2007 | Salter | 715/709 |
| 7,191,121 | B2 * | 3/2007 | Liljeryd et al. | 704/219 |
| 7,272,556 | B1 * | 9/2007 | Aguilar et al. | 704/230 |
| 7,319,764 | B1 * | 1/2008 | Reid et al. | 381/104 |
| 7,424,404 | B2 * | 9/2008 | Hofmeister | 702/190 |
| 7,464,023 | B2 * | 12/2008 | Parry et al. | 704/9 |
| 7,496,852 | B2 * | 2/2009 | Eichorn et al. | 715/764 |
| 7,725,828 | B1 * | 5/2010 | Johnson | 715/726 |
| 7,739,595 | B2 * | 6/2010 | Salter | 715/709 |
| 7,742,914 | B2 * | 6/2010 | Kosek et al. | 704/282 |
| 7,818,079 | B2 * | 10/2010 | Vaananen et al. | 700/94 |
| 7,842,874 | B2 * | 11/2010 | Jehan | 84/609 |
| 7,979,270 | B2 * | 7/2011 | Yamada | 704/205 |
| 8,145,496 | B2 * | 3/2012 | Transeau | 704/278 |
| 8,170,396 | B2 * | 5/2012 | Kuspa et al. | 386/282 |
| 8,229,754 | B1 * | 7/2012 | Ramirez et al. | 704/278 |
| 8,233,772 | B1 * | 7/2012 | Young | 386/278 |
| 8,295,687 | B1 * | 10/2012 | Kuspa | 386/282 |
| 8,314,321 | B2 * | 11/2012 | Wun et al. | 84/615 |
| 8,504,181 | B2 * | 8/2013 | Seefeldt et al. | 700/94 |
| 8,535,236 | B2 * | 9/2013 | Heinz et al. | 600/559 |
| 2001/0044722 | A1 * | 11/2001 | Gustafsson et al. | 704/258 |
| 2001/0047717 | A1 * | 12/2001 | Aoki et al. | 84/611 |
| 2002/0017188 | A1 * | 2/2002 | Aoki | 84/611 |
| 2002/0029685 | A1 * | 3/2002 | Aoki | 84/613 |
| 2002/0183874 | A1 * | 12/2002 | McKinney et al. | 700/94 |
| 2003/0058280 | A1 * | 3/2003 | Molinari et al. | 345/771 |
| 2003/0068053 | A1 * | 4/2003 | Chu | 381/118 |
| 2003/0088402 | A1 * | 5/2003 | Hoory et al. | 704/207 |
| 2003/0094090 | A1 * | 5/2003 | Tamura et al. | 84/602 |
| 2003/0151628 | A1 * | 8/2003 | Salter | 345/773 |
| 2003/0221542 | A1 * | 12/2003 | Kenmochi et al. | 84/616 |
| 2004/0054527 | A1 * | 3/2004 | Quatieri, Jr. | 704/207 |
| 2004/0161118 | A1 * | 8/2004 | Chu | 381/61 |
| 2004/0221710 | A1 * | 11/2004 | Kitayama | 84/654 |
| 2004/0249630 | A1 * | 12/2004 | Parry et al. | 704/5 |
| 2004/0260540 | A1 * | 12/2004 | Zhang | 704/205 |
| 2005/0016360 | A1 * | 1/2005 | Zhang | 84/600 |
| 2005/0065784 | A1 * | 3/2005 | McAulay et al. | 704/205 |
| 2005/0145099 | A1 * | 7/2005 | Lengeling et al. | 84/645 |
| 2005/0262451 | A1 * | 11/2005 | Remignanti et al. | 715/833 |
| 2006/0007151 | A1 * | 1/2006 | Ram | 345/163 |
| 2006/0074649 | A1 * | 4/2006 | Pachet et al. | 704/229 |
| 2006/0075884 | A1 * | 4/2006 | Streitenberger et al. | 84/616 |
| 2006/0156906 | A1 * | 7/2006 | Haeker | 84/609 |
| 2006/0173676 | A1 * | 8/2006 | Kemmochi et al. | 704/207 |
| 2006/0227814 | A1 * | 10/2006 | Iannuzzelli et al. | 370/516 |
| 2006/0276149 | A1 * | 12/2006 | Womac et al. | 455/133 |
| 2006/0279538 | A1 * | 12/2006 | Chang et al. | 345/156 |
| 2007/0016045 | A1 * | 1/2007 | Zhang | 600/443 |
| 2007/0071116 | A1 * | 3/2007 | Oshikiri | 375/260 |
| 2007/0157796 | A1 * | 7/2007 | Akazawa et al. | 84/604 |
| 2007/0193436 | A1 * | 8/2007 | Chu | 84/609 |
| 2007/0271285 | A1 * | 11/2007 | Eichorn et al. | 707/101 |
| 2007/0288235 | A1 * | 12/2007 | Vaananen et al. | 704/229 |
| 2008/0051659 | A1 * | 2/2008 | Waki et al. | 600/443 |
| 2008/0133225 | A1 * | 6/2008 | Yamada | 704/207 |
| 2008/0147413 | A1 * | 6/2008 | Sobol-Shikler | 704/278 |
| 2008/0253735 | A1 * | 10/2008 | Kuspa et al. | 386/52 |
| 2008/0307442 | A1 * | 12/2008 | Lim et al. | 719/321 |
| 2009/0002315 | A1 * | 1/2009 | Chu | 345/156 |
| 2009/0315889 | A1 * | 12/2009 | Tognola | 345/440 |

FOREIGN PATENT DOCUMENTS

| | | | | |
|---|---|---|---|---|
| JP | 2007-248519 A | * | 9/2007 | G10H 7/00 |
| WO | WO 2006079813 A1 | * | 8/2006 | G10H 1/36 |

OTHER PUBLICATIONS

Adobe Audition Microsoft Windows 2000/Windows XP.* bing search q=pitch%20envelope%20vary&qs=n&form= Jun. 29, 2015.* bing search q=pitch+envelope&FORM=AWRE Jun. 29, 2015.* bing search q=tone%20envelope%20vary&qs=n&form=Q Jun. 29, 2015.*

"Microsoft® Windows® 2000/Windows XP Adobe Audition version 1.5", Adobe Systems Incorporated, [Online]. Retrieved from the Internet: <http://web.archive.org/web/20040426000056/www.adobe.com/products/audition/pdfs/audition-nfhs.p>, (Mar. 4, 2004), 308 pgs.

* cited by examiner

PITCH SHIFTING FREQUENCIES

BACKGROUND

Different visual representations of audio data are commonly used to display different features of the audio data. For example, a frequency spectrogram shows a representation of frequencies of the audio data in the time-domain (e.g., a graphical display with time on the x-axis and frequency on the y-axis). Audio data can be edited. For example, the audio data can include noise or other unwanted components (e.g., one or more incorrect pitches).

A pitch is the perceived fundamental frequency of a sound. While the actual fundamental frequency can be precisely determined through physical measurement, it may differ from the perceived pitch because of overtones, or partials, in the sound. Perceived pitch can depend on the amplitude of the sound, especially at low frequencies. For instance, a low bass note will sound lower in pitch if it is louder. Frequency is the measurement of the number of occurrences of a repeated event per unit of time. To calculate the frequency of the event, the number of occurrences of the event within a fixed time interval are counted, and then divided by the length of the time interval. For example, the frequency of the standard pitch A above middle C is usually defined as 440 Hz (440 cycles per second). An occurrence of the standard pitch A above middle C at 450 Hz (450 cycles per second), would then likely sound out of tune (e.g., sharp) to the listener. Similarly, an occurrence of the standard pitch A above middle C at 430 Hz (430 cycles per second), would also likely sound out of tune (e.g., flat) to the listener.

Removing or editing unwanted audio components improves audio quality (i.e., the removal of noise components provides a clearer audio signal, and the removal of incorrect pitches provides a more accurate and pleasing audio signal). Alternatively, a user may apply different processing operations (e.g., edits), to portions of the audio data to generate particular audio effects.

Audio editing by frequency, for example, typically involves pitch shifting an entire selected frequency range by the same ratio. Pitch shifting is a sound recording technique, in which the normal pitch or tone of a sound is altered (e.g., shifted), for effect or for other purposes (e.g., to tune an out-of-tune pitch). Pitch shifting may be done both in analog and in digital recording and usually involves no more than a half-step (semitone) or possibly whole step (whole tone) change to the pitch. In digital recording, pitch shifting is accomplished through digital signal processing.

To apply a pitch shifting effect on a particular frequency, for example, an entire frequency range is selected. The entire frequency range is then copied into a new (e.g., blank), file and pitch shifted. Current pitch shifting algorithms are not designed to be implemented on specific frequency ranges (e.g., a range of 100 Hz to 200 Hz), and thus the entire selected frequency range is edited (e.g., shifted) by the same ratio.

SUMMARY

In general, in one aspect, a computer-implemented method is provided. The computer-implemented method includes presenting a visual representation of digital audio data as a frequency spectrum including a first visual region corresponding to a first time period and a first frequency range in the digital audio data. A first user input is received identifying a second visual region within the first visual region where the second visual region corresponds to a second time period and a second frequency range in the digital audio data, and where the second time period is within the first time period and the second frequency range is within the first frequency range.

A second user input is received specifying one or more frequency modifications to the second time period and the second frequency range in the second visual region of the digital audio data. The second time period and the second frequency range of the digital audio data corresponding to the second visual region are then modified to create a modified second visual region. The modified second visual region is then mixed into the first visual region to create edited digital audio data. Embodiments of the aspect can include systems and computer program products.

Implementations of the aspect can optionally include one or more of the following features. Modifying the second time period and the second frequency range of the digital audio data can occur within the initial visual display of the digital audio data. Specifying one or more frequency modifications can include automatically creating a graphic representation of a control envelope for the second time period and the second frequency range, where the graphic representation is a line with two endpoints. Editing the graphic representation of the control envelope can include manipulating one or more control points on the control envelope, where each control point can be manipulated to adjust the frequency of the second time period and the second frequency range of the digital audio data.

Modifying the second time period and the second frequency range of the audio data can include identifying one or more additional visual regions within the digital audio data corresponding to the second visual region, and applying the modification made within the second visual region of the digital audio data to each additional region of digital audio data corresponding to the second visual region to create modified additional visual regions. Additionally, each modified additional region can be mixed into the first visual region to create additional edited digital audio data.

Modifying the second visual region of the digital audio data can also include identifying a specific frequency range and modifying the second visual region of the audio data according to the specific frequency range.

Particular embodiments of the subject matter described in this specification can be implemented to realize one or more of the following advantages. A user can select an arbitrary region of a displayed visual representation of audio data to select an arbitrary portion of the corresponding audio data (e.g., a particular frequency range or pitch), for editing. By drawing a selection region directly on the displayed audio data, the user can visually identify and isolate a particular frequency range within the audio data for editing. Tailoring the selected region to a particular frequency range within the audio data allows the user to perform finely tuned frequency edits.

The selected region can be isolated so that the user can edit directly in the audio display without extracting the selected portion of the audio data into a new file (e.g., a new window). Editing directly in the initial audio display allows user interface tools to be available to the user in the main display widow. The same user interface tools may need to be generated or may not even be available in a newly generated editing window. Thus, the complexity of extracting a non-rectangular selection of audio data (e.g., requiring a specific user interface tool) into a new window is avoided.

Additionally, editing directly in the initial audio display requires fewer steps (e.g., a second window does not need to be created and accessed), and allows the user to see the underlying audio in context to the surrounding audio. Thus, user edits can be made in view of the context of the other frequencies in the audio file. For example, when editing an audio file with more than one instrument, the pitches for both instruments are displayed to the user. Thus, while editing a pitch corresponding to one instrument, the user can visually line up the selection tool with the visual display of the pitch corresponding to the other instrument. The ability to visually select pitches facilitates the editing of harmonically related pitches as they occur in time.

The selected region can also be used to manually or automatically identify one or more additional regions (e.g., regions similar to the selected region) within the audio data to manually or automatically edit in a manner similar to the originally selected region. This greatly simplifies the editing task when there is a recurrent "out of tune" note inherent to the physical qualities of a specific type of instrument. Additionally, a selected region can also be manually or automatically edited according to a predetermined (e.g., user-selected) frequency range or scale. Thus, portions of the selected region outside the predetermined frequency range or scale are edited to be within or conform to the predetermined frequency range or scale. Furthermore, user edits to the displayed audio data seamlessly edits the underlying audio file.

The details of one or more embodiments of the invention are set forth in the accompanying drawings and the description below. Other features, aspects, and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
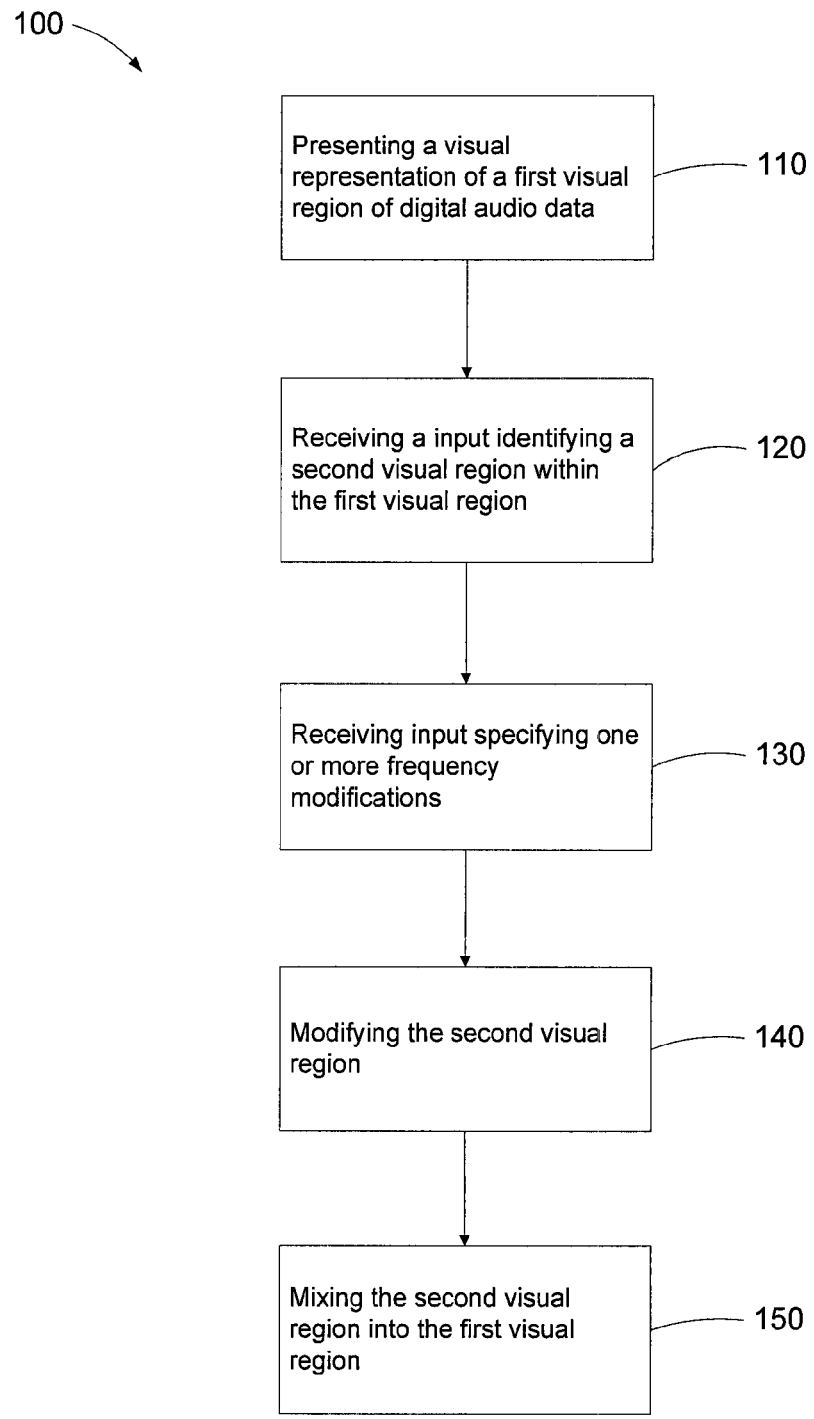
FIG. 1 is a flowchart of an example method for editing a frequency spectrum display or audio data.

FIG. 1 is a flowchart of an example method 100 for editing audio data (e.g., digital audio data). For convenience, the method 100 will be described with reference to a system that performs the method 100. The system receives audio data that represents sound. Sound can be characterized by the generic properties of waves, which are frequency, wavelength, period, amplitude, speed, and direction. Audio data can be part of other content (e.g., video, PDF, Adobe Flash, etc.). Audio data can represent a combination of audio sources that can be treated in combination as a single audio data. For example, the system can receive audio data from multiple sources, combine the audio data into a single source, and store the combined source of audio data on a single editable storage medium (e.g. an audio track). Audio data can be stored in a file with a specific audio file format (e.g., WAV, AIFF, AU, WMA, or MP3).

The system can receive the audio data, for example, as incorporated into a single track. Alternatively, a received audio track can be, for example, a mixdown track that is a combination of multiple tracks. The system can receive audio data in response to a user input to the system selecting particular audio data to edit. The system can also receive audio data for other purposes (e.g., for review by the user). In some implementations, the system receives the audio data from a storage device local or remote to the system.

The system presents 110 a visual representation of the audio data (e.g., as a frequency spectrum). For example, the system can display a visual representation of each individual track with respect to a feature of the audio data (e.g., amplitude or frequency), on a feature axis and with respect to time (e.g., in seconds), on a time axis. Alternatively the system can display a visual representation of multiple tracks with respect to a feature of the audio data on a feature axis and with respect to time on a time axis. In some implementations, the visual representation of the audio data includes a first visual region corresponding to a first time period and a first frequency range in the audio data.

Figure 2:
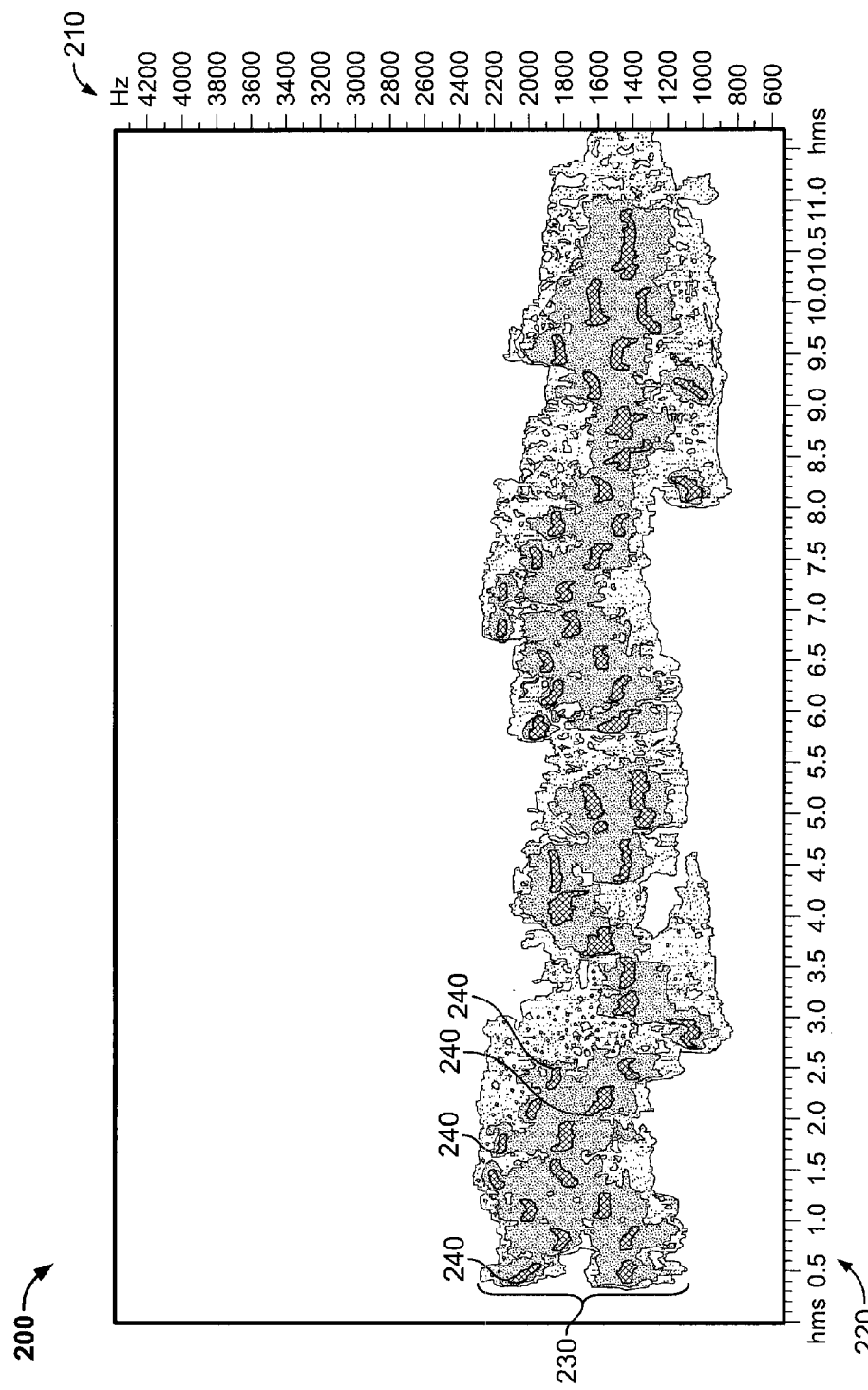
FIG. 2 shows an example frequency spectrum representation of audio data.

FIG. 2 shows an example frequency spectrum representation 200 of audio data as might be displayed by a graphical user interface (GUI). The representation 200 includes a feature axis 210 (e.g., representing frequency), and a time axis 220. The representation can also display audio data having various amplitudes. For example, a darker representation of audio data can signify a greater amplitude and a lighter representation of audio data can signify a lesser amplitude. Alternatively, the representation 200 can present the audio data as an amplitude waveform, pan position display, or phase diagram.

The audio data can be from particular audio sources, for example, voices, music, or noise. In some implementations, the audio data can include only one audio source with one or more out of tune notes. For purposes of illustration, the audio data 230 includes two audio sources which may or may not be occurring in unison (e.g., at the same frequency). Each audio source can contain one or more pitches 240 that is musically or harmonically undesirable. For example, pitches can be perceived as musically or harmonically undesirable if they occur at the wrong time or wrong place in a melody or harmony. Likewise, pitches can be perceived as out of tune if they occur outside the expected frequency boundaries of a traditional musical scale (e.g., a note occurring at 430 Hz or 450 Hz), where the traditional musical scale contains a musical note A corresponding to the audio frequency of 440 Hz.

Pitches in audio data can be edited to compensate for out-of-tune sounds. One way to edit pitches is by pitch shifting. A pitch shifting effect can be applied to a particular pitch (or the perceived fundamental frequency of a sound). Pitch shifting a particular pitch (e.g., at a specific range of frequencies), can be done manually or automatically.

As shown in FIG. 1, to pitch shift a particular pitch, the system receives 120 an arbitrary first input identifying a second visual region (e.g., a second smaller visual region within a first larger visual region) representing the pitch (e.g., by selecting the pitch). For example, the visual representation of the second visual region (the pitch) can correspond to a second time period within a first time period and a second frequency range within a first frequency range in the audio data.

Figure 3:
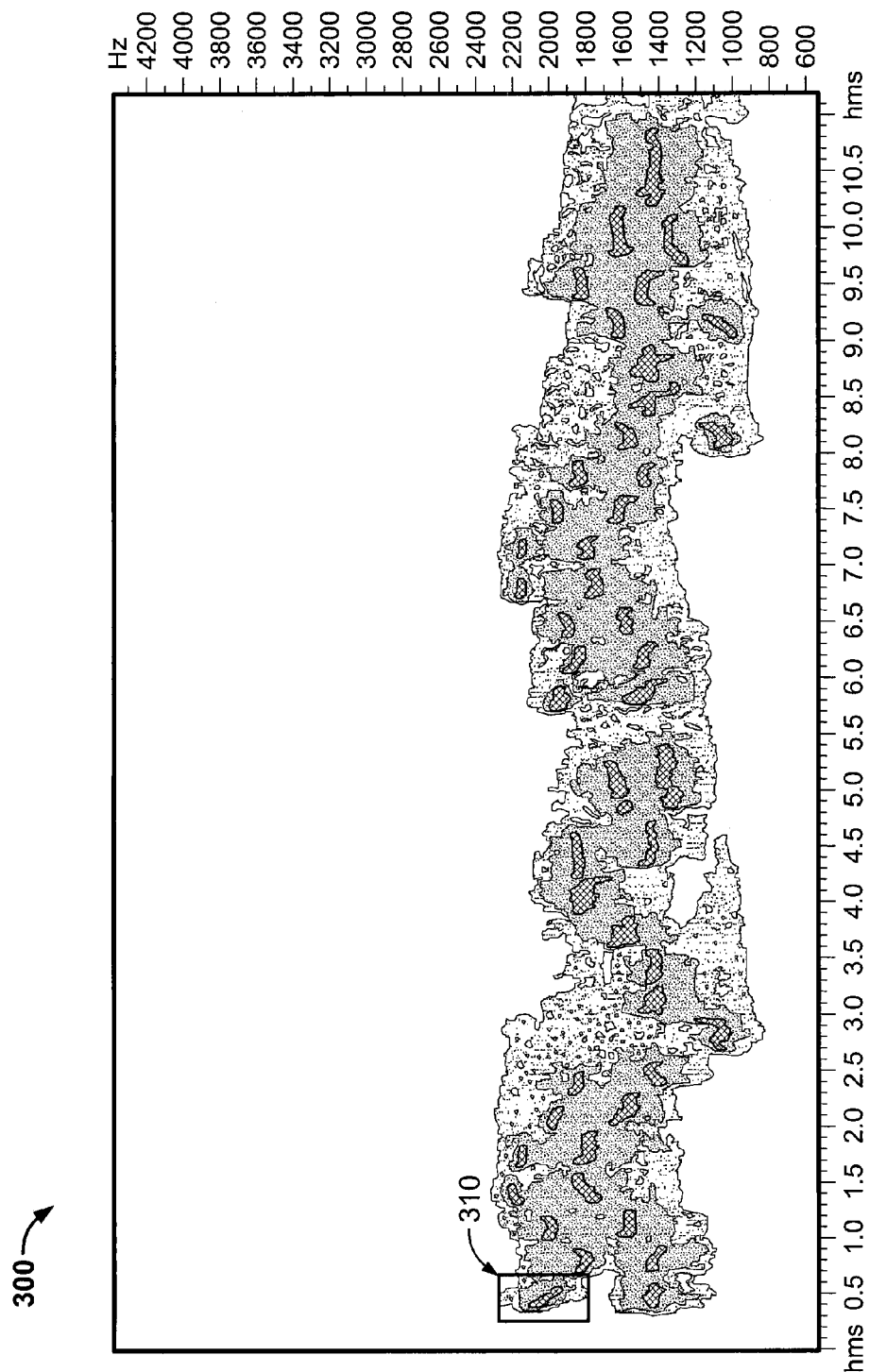
FIG. 3 shows an example frequency spectrum representation of audio data including a demarcated region of audio data representing a pitch at a particular frequency range.

FIG. 3 shows an example frequency spectrum representation 300 of audio data including a region 310 of audio data representing, for example, a pitch that the user wishes to modify. The pitch 310 can be selected manually, based on user input, or automatically, based on one or more specified settings. The pitch 310 can be selected, for example, using a paintbrush, marquee, or lasso selector. In some implementations, a region represents multiple pitches. For purposes of illustration, region 310 represents a single pitch in the audio data corresponding to the time period of 0.3 to 0.5 seconds and frequency range 1900 Hz to 2100 Hz.

The selected pitch and a set of envelope controls (described in greater detail below) can appear in the initial visual display of the audio data, and thus the user can edit the audio data in the region 310 directly.

Alternatively, in some implementations, the system can remove or isolate the visual representation of the selected pitch in the region 310 from the initial visual display and place the isolated pitch within a corresponding view in the visual display representing a magnification of the isolated pitch. The removal and placement of the isolated pitch can be done manually according to user input (e.g., cut and paste) or automatically by the system. The corresponding view in the visual display is a view of the isolated pitch with related frequency values.

Figure 4:
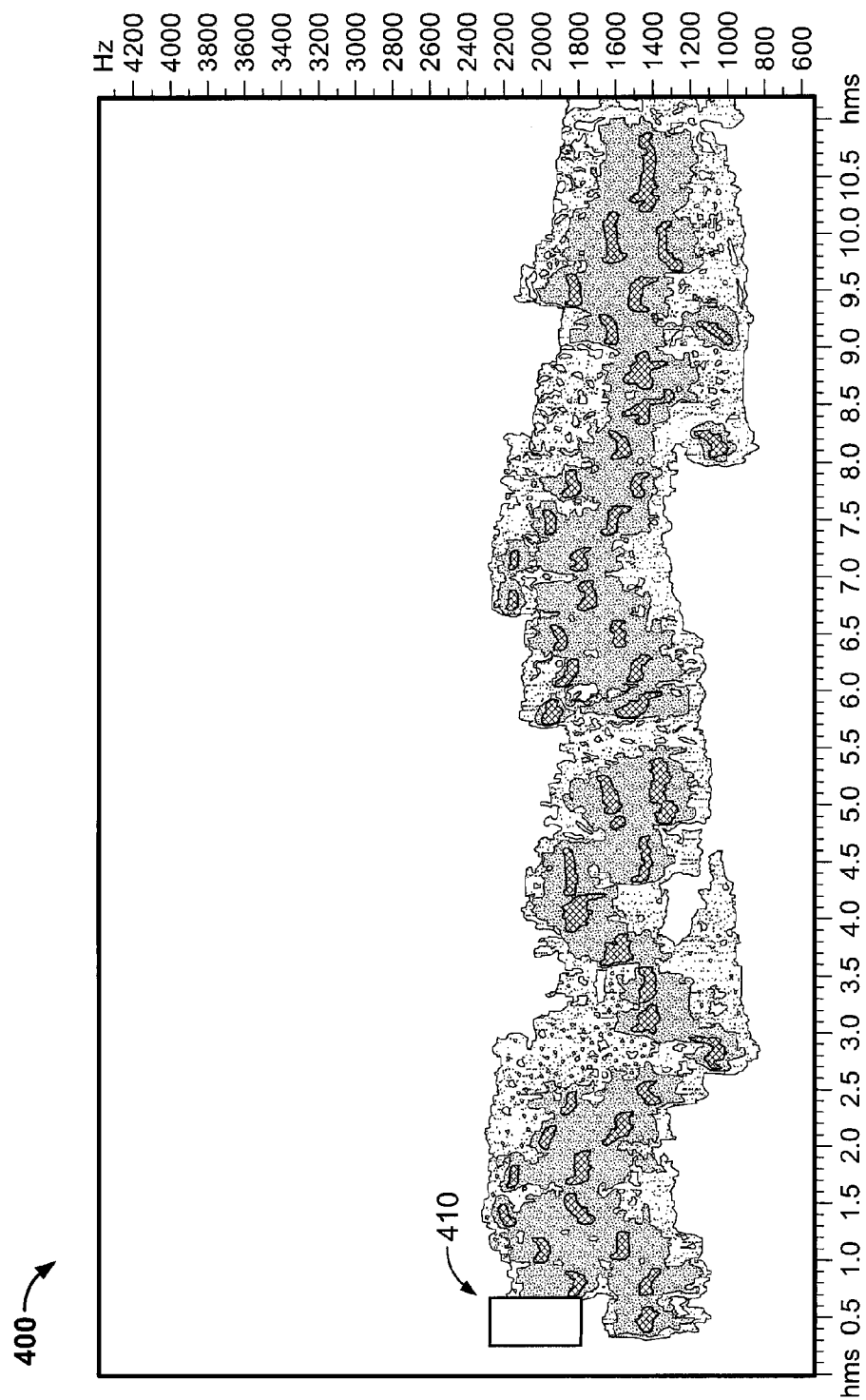
FIG. 4 shows an example frequency spectrum representation of audio data without the isolated pitch in the demarcated region.

FIG. 4 shows an example frequency spectrum representation 400 of audio data without the isolated pitch in the demarcated region 410.

Figure 5:
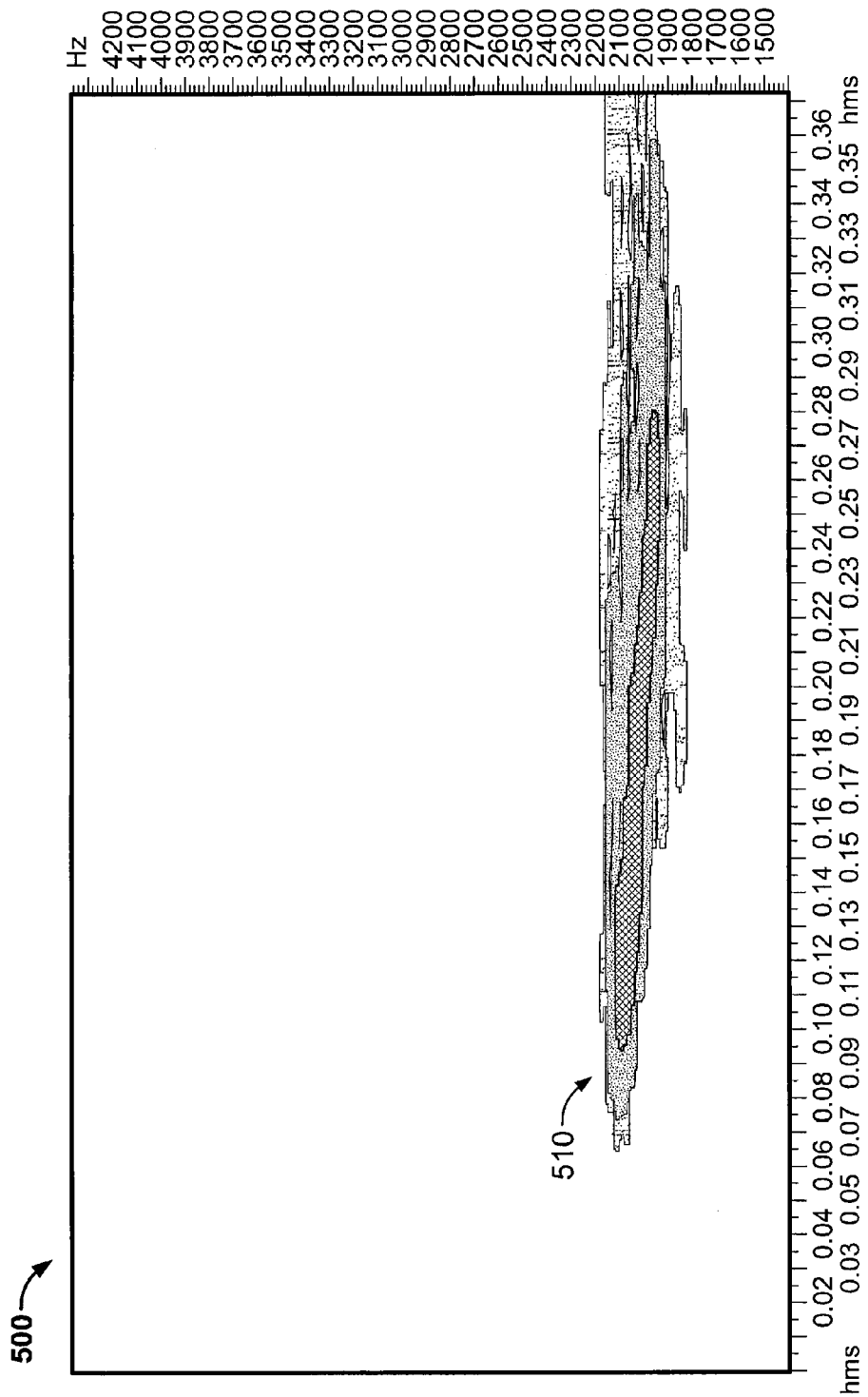
FIG. 5 shows an example presentation of the isolated audio data from the demarcated region of the frequency spectrum.

FIG. 5 shows an example presentation 500 of the isolated audio data 510 (e.g., isolated pitch) from the demarcated region 410 of the frequency spectrum. An isolated pitch can be edited or modified by either the user or the system. In some implementations, the system automatically performs edits on the isolated pitch.

As shown in FIG. 1, the system receives an input 130 specifying one or more frequency modifications in order to modify an isolated pitch. For example, an isolated pitch can initially occur within a first frequency range (e.g., a range of 100 Hz to 200 Hz), be removed from that first frequency range, and be placed (e.g., mixed) into a second frequency range (e.g., a range of 200 Hz to 300 Hz). The first frequency range would then be edited to diminish the effect of removing the isolated pitch. Sampling and mixing in data from areas surrounding the extracted isolated pitch are common techniques used to diminish the effect of removing the isolated pitch.

Figure 6:
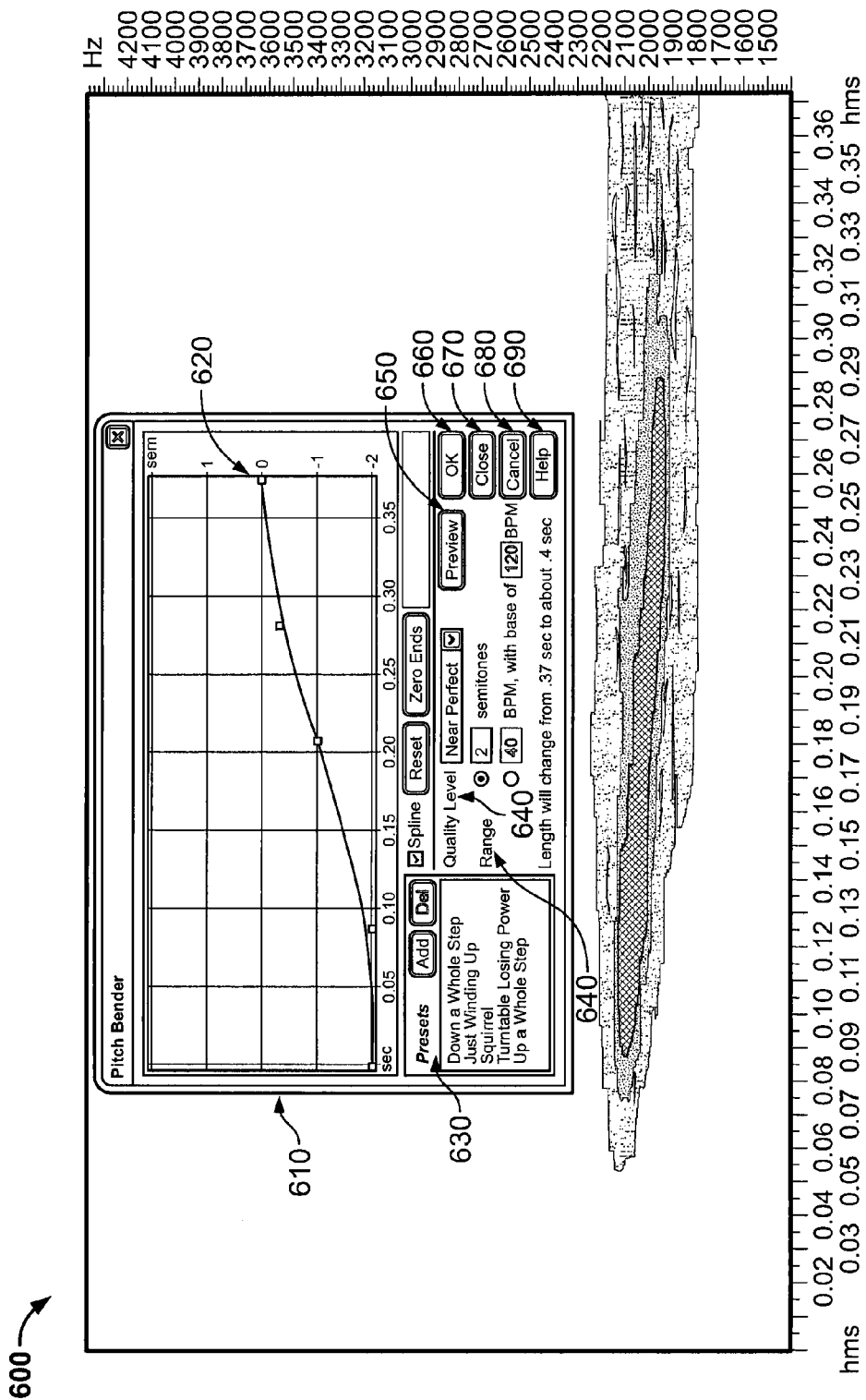
FIG. 6 shows an example presentation of the isolated pitch from the demarcated region of the frequency spectrum with an example presentation of a user interface used to edit the isolated pitch.

FIG. 6 shows an example presentation 600 of the isolated pitch 510 from the demarcated region 410 of the frequency spectrum with an example display of a user interface 610 used to edit the isolated pitch. In various implementations, the display also includes representations of the different controls used for applying effects (e.g., pitch shifting) to the isolated pitch 510. For example, the user interface 610 includes one or more controls for editing the isolated pitch 510. The controls can include a magnified visual display 620 of all or a portion of the isolated pitch 510 requiring the edit. The visual display of the isolated pitch can be displayed with respect to a measured tonal distance (e.g., a semitone) on a feature axis and with respect to time (e.g., in seconds), on a time axis.

The controls can include one or more preset options 630 for presetting configured effects to be applied to the isolated pitch 510. The controls can also include multiple selectable options 640 for configuring the effects on an individual basis, for example, by quality level and range. Quality level refers to the tradeoff in processing done on the sound versus the speed of processing. For example, the higher the quality, the more accurate the algorithm used in processing the sound, but the slower the processing. Range refers to the Y axis of the graphical envelope display.

As shown in FIG. 1, once the effects have been specified, the system modifies 140 the isolated pitch 510 according to the specified effect (i.e., frequency modification). In some implementations, the user previews the isolated pitch 510 with the applied effect, for example, by clicking on the PREVIEW button 650. Additionally, the user may choose to have the system automatically apply the selected effect, for example, by clicking on the OK button 660 which also automatically closes the dialog box. The dialog box may also be closed by clicking on the CLOSE button 670. In some implementations, clicking on an APPLY button applies an effect without closing the dialog box. The preview functionality allows the user to preview the edited pitch prior to mixing the edited pitch into the original audio data. In some implementations, the system also includes an undo operation allowing the user to undo performed audio edits, for example, which do not have the user intended results. Additionally, the user may also decide not to edit the isolated pitch 510, for example, by clicking the CANCEL button 680. Finally, the user may choose to receive assistance by clicking on the HELP button 690.

In some implementations, the user manually edits the isolated pitch 510. In order to manually edit an isolated pitch 510, the user selects the portion of the audio data (e.g., using a marquee selector), and the system automatically isolates the pitch and creates a visual display of an envelope on the pitch. The system then incorporates the user defined pitch alterations made with the envelope controls.

Figure 7:
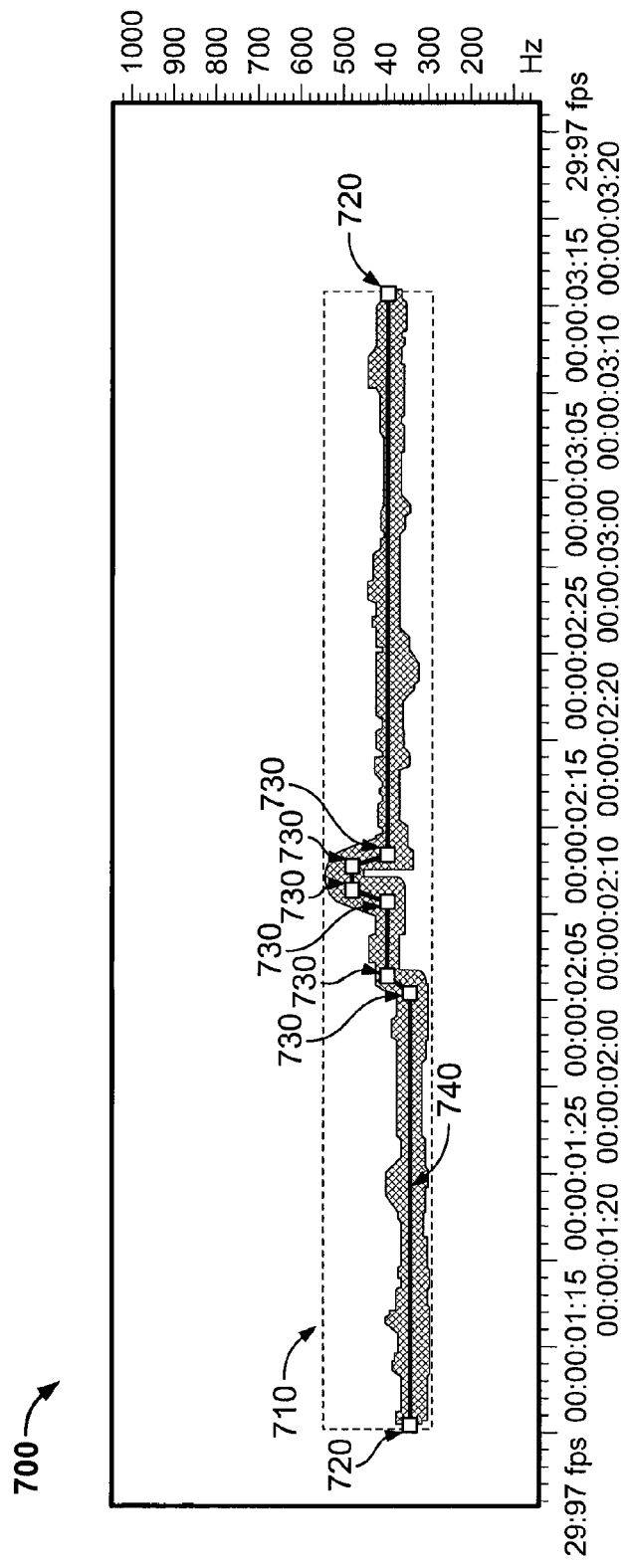
FIG. 7 shows an example presentation of an isolated pitch including a graphic representation of a control envelope having two endpoints and several user selected control points.

FIG. 7 shows an example presentation 700 of an isolated pitch 510 including a graphic representation of a control envelope 710 having two endpoints 720 and several user selected control points 730.

In some implementations, the visual display of the envelope is a line 740, which runs down the center of the isolated pitch 510 and has two endpoints 720, one on each end of the line. In order to edit the isolated pitch 510 using the control envelope 710, the user creates one or more control points 730 at points in the control envelope 710 that require editing. Using the endpoints 720 and the control points 730, the user can manipulate the shape of the control envelope 710 in any direction (e.g., up, down, or at an angle). The system then uses the envelope points, including the end points, to apply pitch correction to the corresponding underlying audio of the isolated pitch 510. In some implementations, if the system detects that a pitch varies over time within the selected time range, the system will add multiple envelope points outlining the pitch variance over time. Each envelope point can then be edited by the user to adjust the pitch.

Changing the shape of the control envelope 710 of the isolated pitch 510, changes the frequency of the isolated pitch 510. Additionally, the change (pitch shift) to the frequency of the isolated pitch is performed within a limited frequency range (e.g., the frequency range relevant to the pitch), without the need to pitch shift an entire range of frequencies unrelated to the frequencies of the isolated pitch 510.

Figure 8:
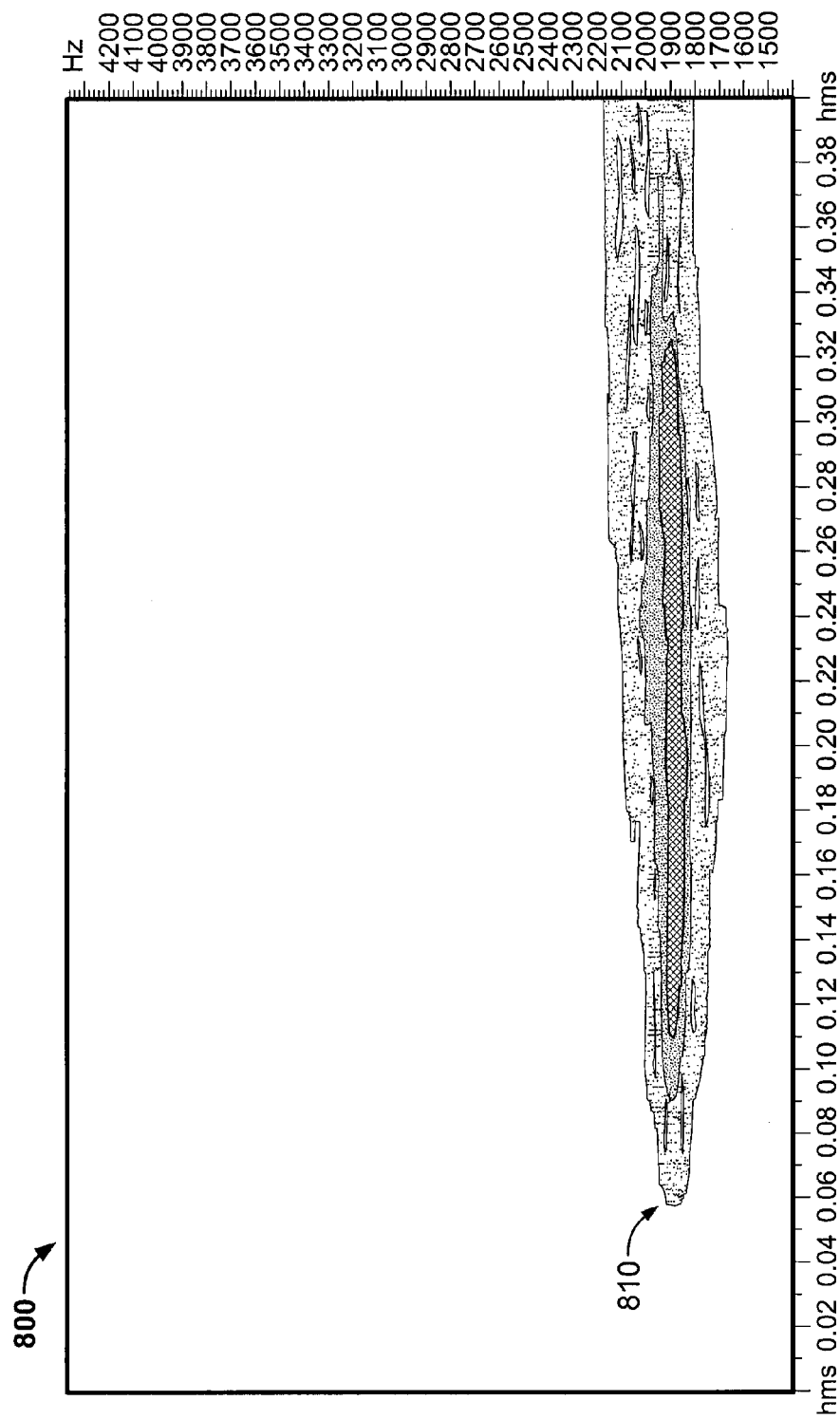
FIG. 8 shows an example presentation of the isolated pitch from the demarcated region of the frequency spectrum after edits have been applied creating an edited pitch.

FIG. 8 shows an example presentation 800 of the isolated pitch from the demarcated region of the frequency spectrum after the edits have been applied creating an edited pitch 810.

As shown in FIG. 1, once the edits are completed, the system mixes 150 the edited pitch back into the audio data creating edited audio data.

Figure 9:
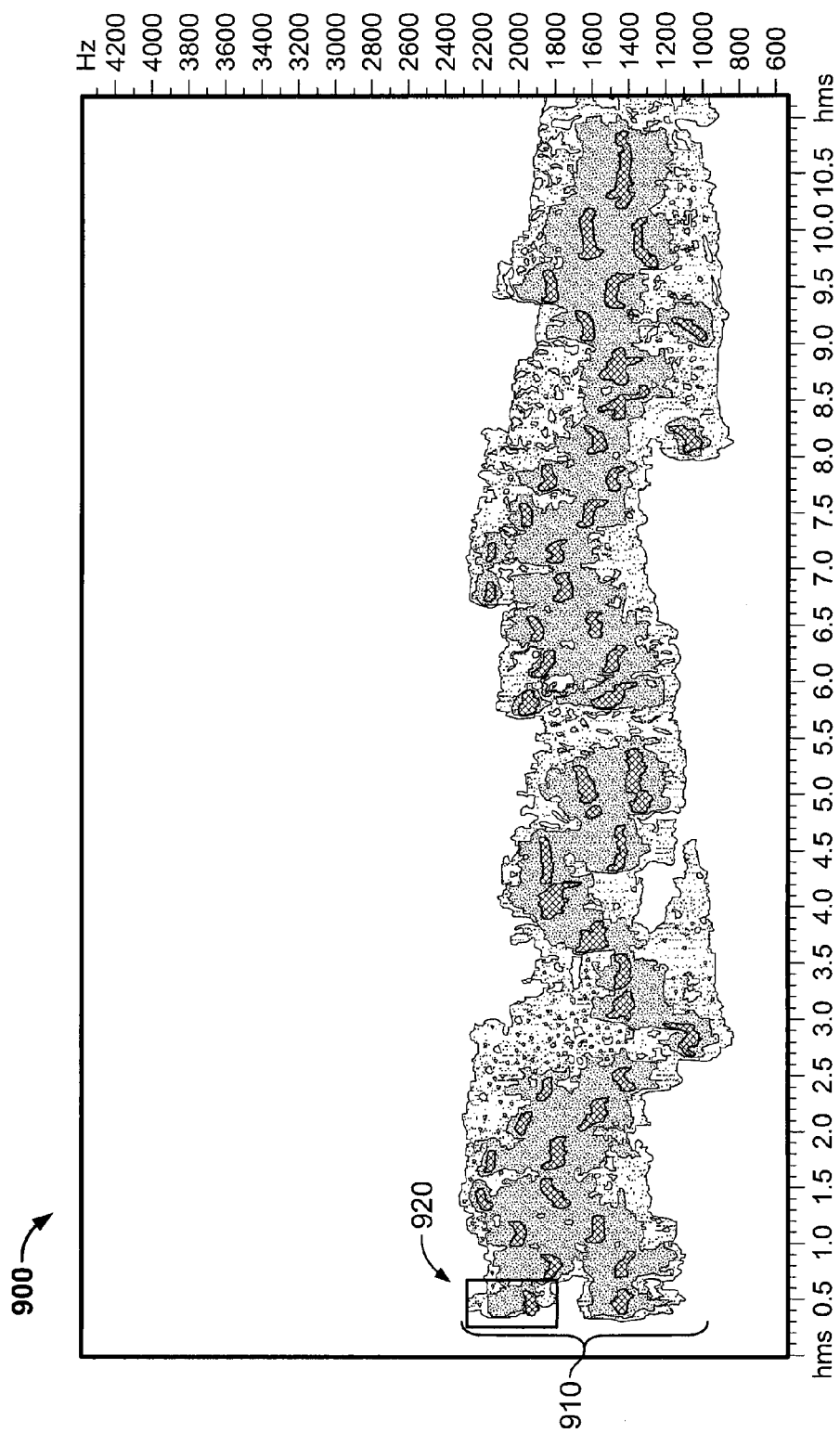
FIG. 9 shows an example presentation of a frequency spectrum representation including the edited audio data.

FIG. 9 shows an example presentation 900 of a frequency spectrum representation including the edited audio data 910. The edited audio data 910 includes the edited pitch 920. The edited audio data 910 can be stored for later processing or use, re-edited, or disregarded. In the event the edited audio data requires re-editing, the user may select and isolate the pitch requiring editing and repeat the process described above for manually or automatically editing the isolated pitch.

In some implementations, after a portion of the audio data has been selected (e.g., a pitch has been isolated either within the visual representation or in a new visual representation), the system automatically identifies one or more similar pitches. The one or more additionally identified pitches can then be edited either manually (e.g., by the user), or automatically (e.g., by the system or within a musical device). The one or more additionally identified pitches can be edited in a manner similar to or different from the edits to the originally isolated pitch. Any additional edited pitches can then be mixed back into the audio data creating additional edited audio data.

In some implementations, a frequency range is specified (e.g., by user input), and edits to the audio data (e.g., the one or more isolated pitches), are performed in accordance with the predetermined frequency range. For example, if the isolated pitch is in a frequency range is from 100 Hz to 400 Hz (i.e., a range of 300 Hz), and the specified frequency range is from 600 Hz to 800 Hz (i.e., a range of 200 Hz), edits to the isolated pitch will be limited to the 200 Hz range. In another example, if the frequency range from 200 Hz to 440 Hz, edits to a pitch occurring at 430 Hz will not exceed 440 Hz (or 10 Hz).

In some implementations, a scale is specified (e.g., by user input), and edits to the audio data (e.g., the one or more isolated pitches), are performed in accordance with the predetermined scale. For example, if the frequencies for the twelve semi-tones in an octave beginning at middle C are: C 262 Hz, C#278 Hz, D 294 Hz, D#311 Hz, E 330 Hz, F 349 Hz, F#370 Hz, G 392 Hz, G#415 Hz, A 440 Hz, A#466 Hz, B 494 Hz, and if the specified scale is C major: C 262 Hz, D 294 Hz, E 330 Hz, F 349 Hz, G 392 Hz, A 440 Hz, B 494 Hz, then edits to an isolated pitch C can not exceed 262 Hz.

Additionally, if an isolated pitch occurs at 268 Hz, it can be edited manually (e.g., by user input) or automatically (e.g., by the system) to either 262 Hz (C) or 294 Hz (D), and both C and D are within the scale of C major. The system in that case prevents an edit to 278 Hz (C#), as C# is not in the scale of C major. In some implementations, an edit for the isolated pitch is suggested to the user (e.g., graphically or numerically) prior to the user selection of the edit.

In implementations where the user chooses to edit additional isolated pitches within the displayed audio data, the additional selected regions are processed and edited in a manner similar to that described above. Once the user has completed editing operations, the edited audio file can be saved and stored for playback, transmission, or other uses.

The method described above can be implemented in a computing system.

Figure 10:
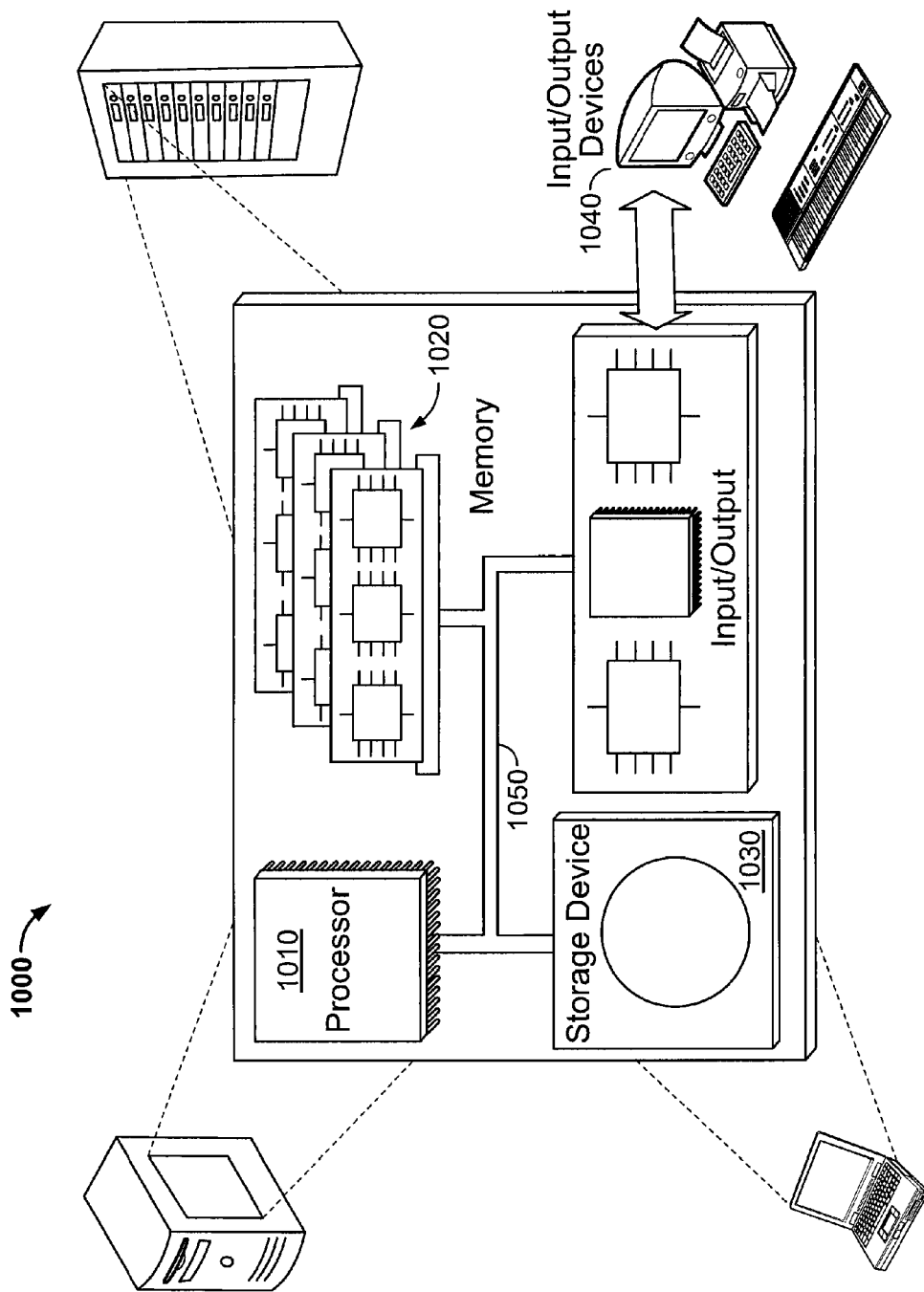
FIG. 10 shows an example presentation of a computing system.

FIG. 10 shows an example presentation of a computing system. FIG. 10 is a schematic diagram of a generic computer system 1000. The system 1000 can be used for practicing operations described in association with the method 100. The system 1000 can include a processor 1010, a memory 1020, a storage device 1030, and input/output devices 1040. Each of the components 1010, 1020, 1030, and 1040 are interconnected using a system bus 1050. The processor 1010 is capable of processing instructions for execution within the system 1000. In one implementation, the processor 1010 is a single-threaded processor. In another implementation, the processor 1010 is a multi-threaded processor. The processor 1010 is capable of processing instructions stored in the memory 1020 or on the storage device 1030 to display graphical information for a user interface on the input/output device 1040.

The memory 1020 is a computer readable medium such as volatile or non volatile that stores information within the system 1000. The memory 1020 can store data structures, for example. The storage device 1030 is capable of providing persistent storage for the system 1000. The storage device 1030 may be a floppy disk device, a hard disk device, an optical disk device, or a tape device, or other suitable persistent storage means. The input/output device 1040 provides input/output operations for the system 1000. In one implementation, the input/output device 1040 includes a keyboard and/or pointing device. In another implementation, the input/output device 1040 includes a display unit for displaying graphical user interfaces.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a computer-readable medium for execution by, or to control the operation of, data processing apparatus. The computer-readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output.

The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard, a pointing device, e.g., a mouse or a trackball, or a musical instrument including musical instrument data interface (MIDI) capabilities, e.g., a musical keyboard, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described is this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims. For example, the actions recited in the claims can be performed in a different order and still achieve desirable results. Additionally, the invention can be embodied in a purpose built device, for example, one built for the on location recording of musical events, where the circuitry of the device contains firmware instructions for the editing procedures described above.

What is claimed is:

1. A computer-implemented method comprising:
presenting a visual representation of digital audio data as a frequency spectrum where the visual representation comprises a first visual region corresponding to a first time period and a first frequency range in the digital audio data;
receiving a first input identifying a second visual region within the first visual region, the second visual region representing a pitch corresponding to a second time period and a second frequency range in the digital audio data, wherein the second time period is within the first time period and the second frequency range is within the first frequency range;
presenting a graphic representation of the pitch represented in the second visual region, wherein one or more envelope control points are included on the pitch when the pitch varies over time within the second time period, the one or more envelopes outlining the pitch variance over time;
receiving second input specifying one or more frequency modifications to the pitch represented in the second visual region of the digital audio data via user manipulation of at least one of the control points;
based on the second input, modifying the digital audio data corresponding to the pitch represented in the second visual region to create a modified pitch in the second visual region; and
mixing the modified digital audio data corresponding to the pitch in the second visual region into the digital audio data to create edited digital audio data.

2. The computer-implemented method of claim 1, further comprising:
modifying the second time period and the second frequency range of the digital audio data within the initial visual display of the digital audio data.

3. The computer-implemented method of claim 1, wherein the graphic representation includes a line with two endpoints, and wherein the multiple control points are located between the two endpoints.

4. The computer-implemented method of claim 1, wherein modifying the digital audio data corresponding to the pitch includes identifying a specific frequency range and modifying the digital audio data corresponding to the pitch according to the specific frequency range.

5. A computer program product, encoded on a non-transitory computer-readable medium, operable to cause data processing apparatus to perform operations comprising:
presenting a visual representation of digital audio data as a frequency spectrum where the visual representation comprises a first visual region corresponding to a first time period and a first frequency range in the digital audio data;
receiving a first input identifying a second visual region within the first visual region, the second visual region representing a pitch corresponding to a second time period and a second frequency range in the digital audio data, wherein the second time period is within the first time period and the second frequency range is within the first frequency range;
presenting a graphic representation of the pitch represented in the second visual region, wherein one or more envelope control points are added to the pitch when the pitch varies over time within the second time period, the one or more envelopes outlining the pitch variance over time;
receiving second input specifying one or more frequency modifications to the pitch represented in the second visual region of the digital audio data via user manipulation of at least one of the control points:
based on the second input, modifying the digital audio data corresponding to the pitch represented in the second visual region to create a modified pitch in the second visual region; and
mixing the modified digital audio data corresponding to the pitch in the second visual region into the digital audio data to create edited digital audio data.

6. The computer program product of claim 5, further comprising:
modifying the second time period and the second frequency range of the digital audio data within the initial visual display of the digital audio data.

7. The computer program product of claim 5 wherein the graphic representation includes a line with two endpoints, and wherein the multiple control points are located between two endpoints.

8. The computer program product of claim 5, wherein modifying the digital audio data corresponding to the pitch includes identifying a specific frequency range and modifying the digital audio data corresponding to the pitch according to the specific frequency range.

9. A system comprising one or more computing devices that have one or more processors and that are operable to perform operations comprising:
presenting a visual representation of digital audio data as a frequency spectrum where the visual representation comprises a first visual region corresponding to a first time period and a first frequency range in the digital audio data;
receiving a first input identifying a second visual region within the first visual region, the second visual region representing a pitch corresponding to a second time period and a second frequency range in the digital audio data, wherein the second time period is within the first time period and the second frequency range is within the first frequency range;
presenting a graphic representation of the pitch represented in the second visual region;
adding one or more envelope control points to the pitch when the pitch varies over time within the second time period, the one or more envelopes outlining the pitch variance over time;
receiving second input specifying one or more frequency modifications to the pitch represented in the second visual region of the digital audio data via user manipulation of at least one of the control points;
based on the second input, modifying the digital audio data corresponding to the pitch represented in the second visual region to create a modified pitch in the second visual region; and
mixing the modified digital audio data corresponding to the pitch in the second visual region into the digital audio data to create edited digital audio data.

10. The system of claim 9, further comprising:
means for modifying the second time period and the second frequency range of the digital audio data within the first visual region of the digital audio data.

11. The system of claim 9, wherein the graphic representation includes a line with two endpoints, and wherein the multiple control points are located between the two endpoints.

12. The system of claim 9, wherein modifying the digital audio data corresponding to the pitch includes identifying a specific frequency range and modifying the digital audio data corresponding to the pitch according to the specific frequency range.

13. The computer-implemented method of claim 1, wherein the modifying includes pitch shifting all of the digital, audio data within the second region by a specified amount.

14. The computer program product of claim 5, wherein the modifying includes pitch shifting all of the digital audio data within the second region by a specified amount.

15. The system of claim 9, wherein the modifying includes pitch shifting all of the digital audio data within the second region by a specified amount.

16. A computer-implemented method comprising:
presenting a visual representation of digital audio data as a frequency spectrum where the visual representation comprises a first visual region corresponding to a first time period and a first frequency range in the digital audio data;
receiving a first input identifying a second visual region within the first visual region, the second visual region representing a pitch corresponding to a second time period and a second frequency range in the digital audio data, wherein the second time period is within the first time period and the second frequency range is within the first frequency range;
presenting a graphic representation of the pitch represented in the second visual region, wherein one or more envelope control points are included on the pitch when the pitch varies over time within the second time period, the one or more envelopes outlining the pitch variance over time receiving second input specifying one or more frequency modifications to the pitch represented in the second visual region of the digital audio data via user manipulation of at least one of the control points;

identifying automatically one or more additional regions within the digital audio data, each additional region including a pitch corresponding to the pitch represented in the second visual region;

based on the second input, modifying the digital audio data corresponding to the pitch represented in the second visual region to create a modified pitch in the second visual region and applying automatically the modification made within the second visual region to digital audio data corresponding to each identified additional region to create a modified pitch in each identified additional region; and mixing the modified digital audio data corresponding to the pitch in the second visual region and the modified digital audio data corresponding to each modified pitch in the identified additional regions into the digital audio data to create edited digital audio data.

17. A computer program product, encoded on a non-transitory computer-readable medium, operable to cause data processing apparatus to perform operations comprising:

presenting a visual representation of digital audio data as a frequency spectrum where the visual representation comprises a first visual region corresponding to a first time period and a first frequency range in the digital audio data;

receiving a first input identifying a second visual region within the first visual region, the second visual region representing a pitch corresponding to a second time period and a second frequency range in the digital audio data, wherein the second time period is within the first time period and the second frequency range is within the first frequency range;

presenting a graphic representation of the pitch represented in the second visual region, wherein one or more envelope control points are added to the pitch when the pitch varies over time within the second time period, the one or more envelopes outlining the pitch variance over time receiving second input specifying one or more frequency modifications to the pitch represented in the second visual region of the digital audio data via user manipulation of at least one of the control points;

identifying automatically one or more additional regions within the digital audio data, each additional region including a pitch corresponding to the pitch represented in the second visual region;

based on the second input, modifying the digital audio data corresponding to the pitch represented in the second visual region to create a modified pitch in the second visual region and applying automatically the modification made within the second visual region to digital audio data corresponding to each identified additional region to create a modified pitch in each identified additional region; and mixing the modified digital audio data corresponding to the pitch in the second visual region and the modified digital audio data corresponding to each modified pitch in the identified additional regions into the digital audio data to create edited digital audio data.

18. A system comprising one or more computing devices that have one or more processors and that are operable to perform operations comprising:

presenting a visual representation of digital audio data as a frequency spectrum where the visual representation comprises a first visual region corresponding to a first time period and a first frequency range in the digital audio data;

receiving a first input identifying a second visual region within the first visual region, the second visual region representing a pitch corresponding to a second time period and a second frequency range in the digital audio data, wherein the second time period is within the first time period and the second frequency range is within the first frequency range;

presenting a graphic representation of the pitch represented in the second visual region;

adding one or more envelope control points to the pitch when the pitch varies over time within the second time period, the one or more envelopes outlining the pitch variance over time receiving second input specifying one or more frequency modifications to the pitch represented in the second visual region of the digital audio data via user manipulation of at least one of the control points;

identifying automatically one or more additional regions within the digital audio data, each additional region including a pitch corresponding to the pitch represented in the second visual region;

based on the second input, modifying the digital audio data corresponding to the pitch represented in the second visual region to create a modified pitch in the second visual region and applying automatically the modification made within the second visual region to digital audio data corresponding to each identified additional region to create a modified pitch in each identified additional region; and mixing the modified digital audio data corresponding to the pitch in the second visual region and the modified digital audio data corresponding to each modified pitch in the identified additional regions into the digital audio data to create edited digital audio data.

19. The computer-implemented method of claim 1, wherein the multiple control points are created automatically.

20. The computer-implemented method of claim 1, wherein the multiple control points are user-created.

* * * * *